(12) United States Patent
Thompson

(10) Patent No.: US 7,377,071 B1
(45) Date of Patent: May 27, 2008

(54) INSULATED MINNOW BUCKET

(76) Inventor: Roscoe Thompson, 5539 Mossy Top Way, Tallahassee, FL (US) 32303

( * ) Notice: Subject to any disclaimer, the term of this patent is extended or adjusted under 35 U.S.C. 154(b) by 3 days.

(21) Appl. No.: 11/427,278

(22) Filed: Jun. 28, 2006

(51) Int. Cl.
*A01K 97/05* (2006.01)

(52) U.S. Cl. ........................................................ 43/56

(58) Field of Classification Search .................... 43/56, 43/57, 55; 62/371; 220/770
See application file for complete search history.

(56) References Cited

U.S. PATENT DOCUMENTS

| | | | | |
|---|---|---|---|---|
| 204,168 | A * | 5/1878 | Roney | 43/56 |
| 1,709,424 | A * | 4/1929 | Zohe | 43/56 |
| 2,093,132 | A * | 9/1937 | Logan | 43/56 |
| 2,489,710 | A * | 11/1949 | Janisch et al. | 43/56 |
| 2,531,628 | A * | 11/1950 | Janisch et al. | 43/56 |
| 2,539,412 | A * | 1/1951 | Faris | 43/56 |
| D161,816 | S * | 2/1951 | Blakeslee | 43/56 |
| D163,697 | S * | 6/1951 | Keiding et al. | 43/56 |
| 2,561,488 | A * | 7/1951 | Barker | 229/117.24 |
| 2,594,172 | A * | 4/1952 | Huffman et al. | 43/56 |
| 2,627,996 | A * | 2/1953 | Dorner | 220/814 |
| 2,716,834 | A * | 9/1955 | De Bonville et al. | 43/55 |
| 2,899,103 | A * | 8/1959 | Ebert | 43/55 |
| 2,949,691 | A * | 8/1960 | Johnson | 43/55 |
| 3,002,312 | A * | 10/1961 | Barker | 43/56 |
| 3,077,695 | A * | 2/1963 | Winter | 43/56 |
| 3,344,552 | A * | 10/1967 | Glasco | 43/56 |
| 3,452,469 | A * | 7/1969 | White | 43/55 |
| 3,553,880 | A * | 1/1971 | Splickan et al. | 43/55 |
| 3,654,773 | A * | 4/1972 | White | 62/371 |
| 3,734,336 | A * | 5/1973 | Rankow et al. | 220/770 |
| 3,882,628 | A * | 5/1975 | Stouder | 43/55 |
| 4,030,227 | A * | 6/1977 | Oftedahl | 43/56 |
| 4,096,657 | A * | 6/1978 | Morrow | 43/56 |
| 4,428,145 | A * | 1/1984 | Wheeler | 43/55 |
| 4,513,525 | A * | 4/1985 | Ward et al. | 43/56 |
| 4,759,148 | A * | 7/1988 | Love | 43/56 |
| 4,763,438 | A * | 8/1988 | Saliaris | 43/56 |
| 4,861,301 | A * | 8/1989 | Pomeroy et al. | 441/131 |
| 4,864,769 | A * | 9/1989 | Sandahl | 43/56 |
| 5,109,625 | A * | 5/1992 | Skrede | 43/56 |
| 5,499,473 | A * | 3/1996 | Ramberg | 43/55 |
| D369,201 | S * | 4/1996 | Salvo et al. | D22/136 |
| 5,564,583 | A * | 10/1996 | Kelley et al. | 220/770 |
| 6,357,169 | B1 * | 3/2002 | Gouge | 43/56 |
| 6,729,066 | B1 * | 5/2004 | Howley | 43/56 |
| 6,857,222 | B1 * | 2/2005 | King | 43/56 |
| 7,305,793 | B1 * | 12/2007 | Macdonald | 43/54.1 |
| 2002/0020104 | A1 * | 2/2002 | Kolar et al. | 43/55 |

FOREIGN PATENT DOCUMENTS

JP    2001148986 A  *  6/2001

* cited by examiner

*Primary Examiner*—Darren W Ark

(57) ABSTRACT

An insulated minnow bucket with an attached ventilated lid. The bucket is fabricated from an outer shell and an inner shell that is placed within it, with both the outer shell and the inner shell preferably being cylindrical in nature. A lid that is ventilated with a number of holes is associated with the bucket. A handle is associated with the both of the shells and the lid and is inserted through a pair of holes located in the outer shell and inner shell to insure that the handle remains attached to the bucket. The handle also is inserted through a portion of the lid.

1 Claim, 3 Drawing Sheets

INSULATED MINNOW BUCKET

BACKGROUND OF THE INVENTION

The present invention concerns that of a new and improved insulated minnow bucket with an attached ventilated lid.

DESCRIPTION OF THE PRIOR ART

U.S. Pat. No. 3,654,773, issued to White, discloses a controlled temperature bait bucket which includes a small inner container with an insulated bottom and heat conducting sides within a large outer insulated bucket.

U.S. Pat. No. 6,357,169 B1, issued to Gouge, discloses a bait saver bucket with a multi-chambered container having separation for segregating different sizes of live bait.

U.S. Pat. No. 5,109,625, issued to Skrede, discloses a bait bucket and locking tray that includes an inner shell housing a bait tray.

U.S. Pat. No. 4,763,438, issued to Saliaris, discloses a portable live bait container for use by anglers to transport and facilitate use of live bait such as minnows or shrimp or the like.

U.S. Pat. No. 4,096,657, issued to Morrow, discloses a live minnow bait kit for making accessible a submerged minnow and facilitating its attachment to a fishhook.

SUMMARY OF THE INVENTION

The present invention concerns that of a new and improved insulated minnow bucket with an attached ventilated lid. The bucket is fabricated from an outer shell and an inner shell that is placed within it, with both the outer shell and the inner shell preferably being cylindrical in nature. A lid that is ventilated with a plurality of holes is associated with the bucket. A handle is associated with the both of the shells and the lid and is inserted through a pair of holes located in the outer shell and inner shell to insure that the handle remains attached to the bucket. The handle also is inserted through a portion of the lid.

There has thus been outlined, rather broadly, the more important features of an insulated minnow bucket that the detailed description thereof that follows may be better understood and in order that the present contribution to the art may be better appreciated. There are, of course, additional features of the insulated minnow bucket that will be described hereinafter and which will form the subject matter of the claims appended hereto.

In this respect, before explaining at least one embodiment of the insulated minnow bucket in detail, it is to be understood that the insulated minnow bucket is not limited in its application to the details of construction and to the arrangements of the components set forth in the following description or illustrated in the drawings. The insulated minnow bucket is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present insulated minnow bucket. It is important, therefore, that the claims be regarded as including such equivalent constructions insofar as they do not depart from the spirit and scope of the present invention.

It is therefore an object of the present invention to provide an insulated minnow bucket which has all of the advantages of the prior art and none of the disadvantages.

It is another object of the present invention to provide an insulated minnow bucket which may be easily and efficiently manufactured and marketed.

It is another object of the present invention to provide an insulated minnow bucket which is of durable and reliable construction.

It is yet another object of the present invention to provide an insulated minnow bucket which is economically affordable and available for relevant market segment of the purchasing public.

Other objects, features and advantages of the present invention will become more readily apparent from the following detailed description of the preferred embodiment when considered with the attached drawings and appended claims.

DESCRIPTION OF THE PREFERRED EMBODIMENT

Figure 1:
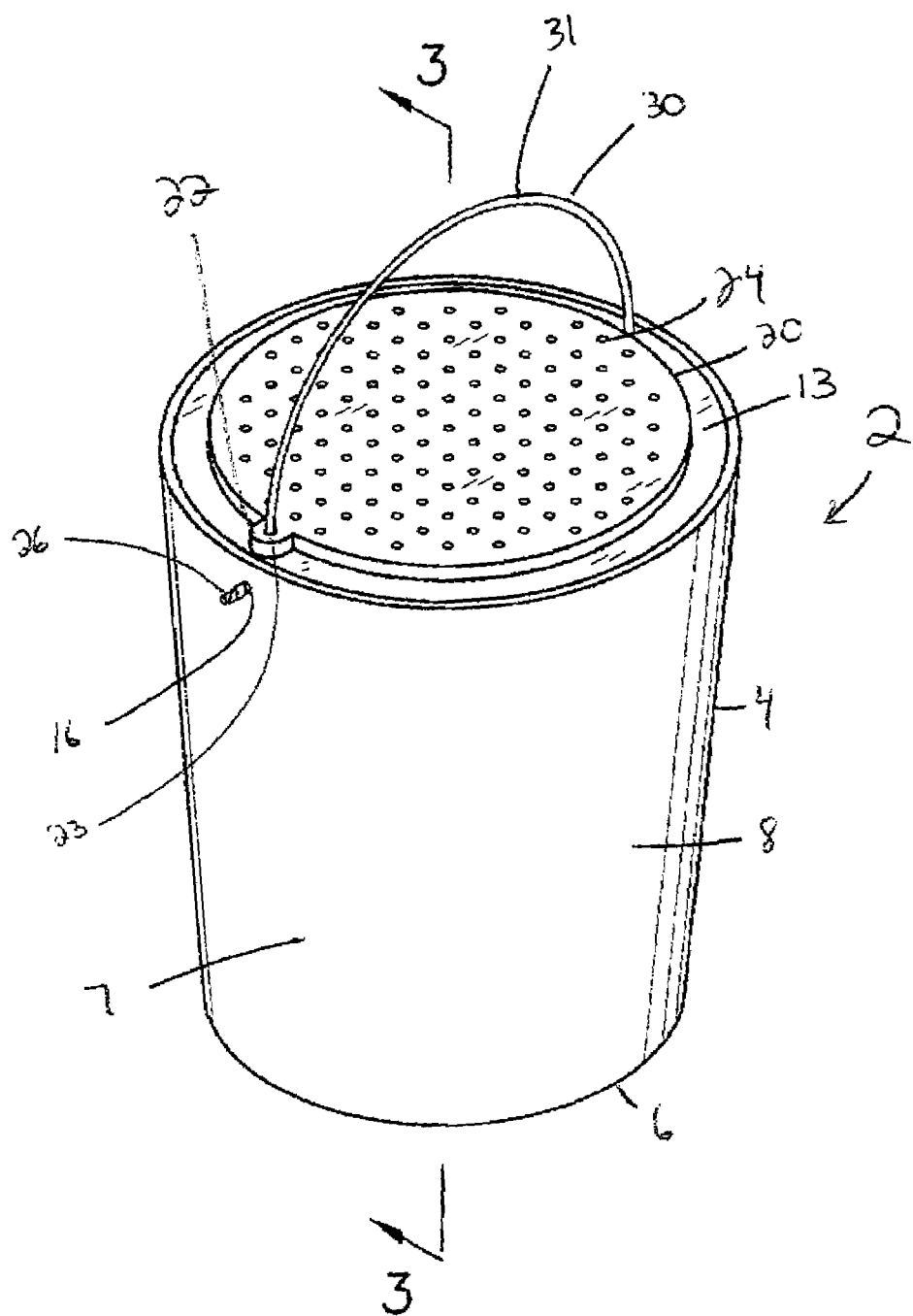
FIG. 1 shows a perspective view of the insulated minnow bucket as it would appear in use with the lid closed over the top of the outer shell and inner shell.
Figure 2:
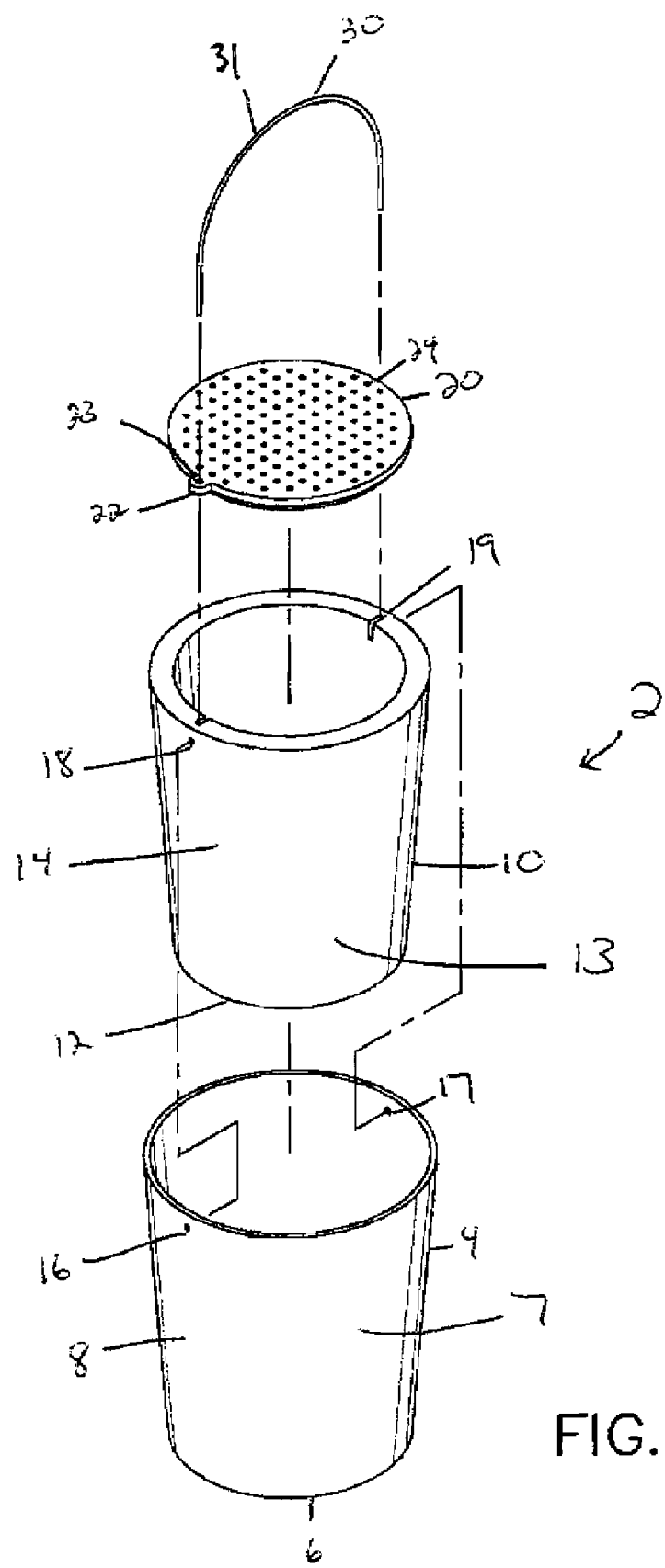
FIG. 2 shows a perspective view of the various components of the minnow bucket as they are seen separated from one another.
Figure 3:
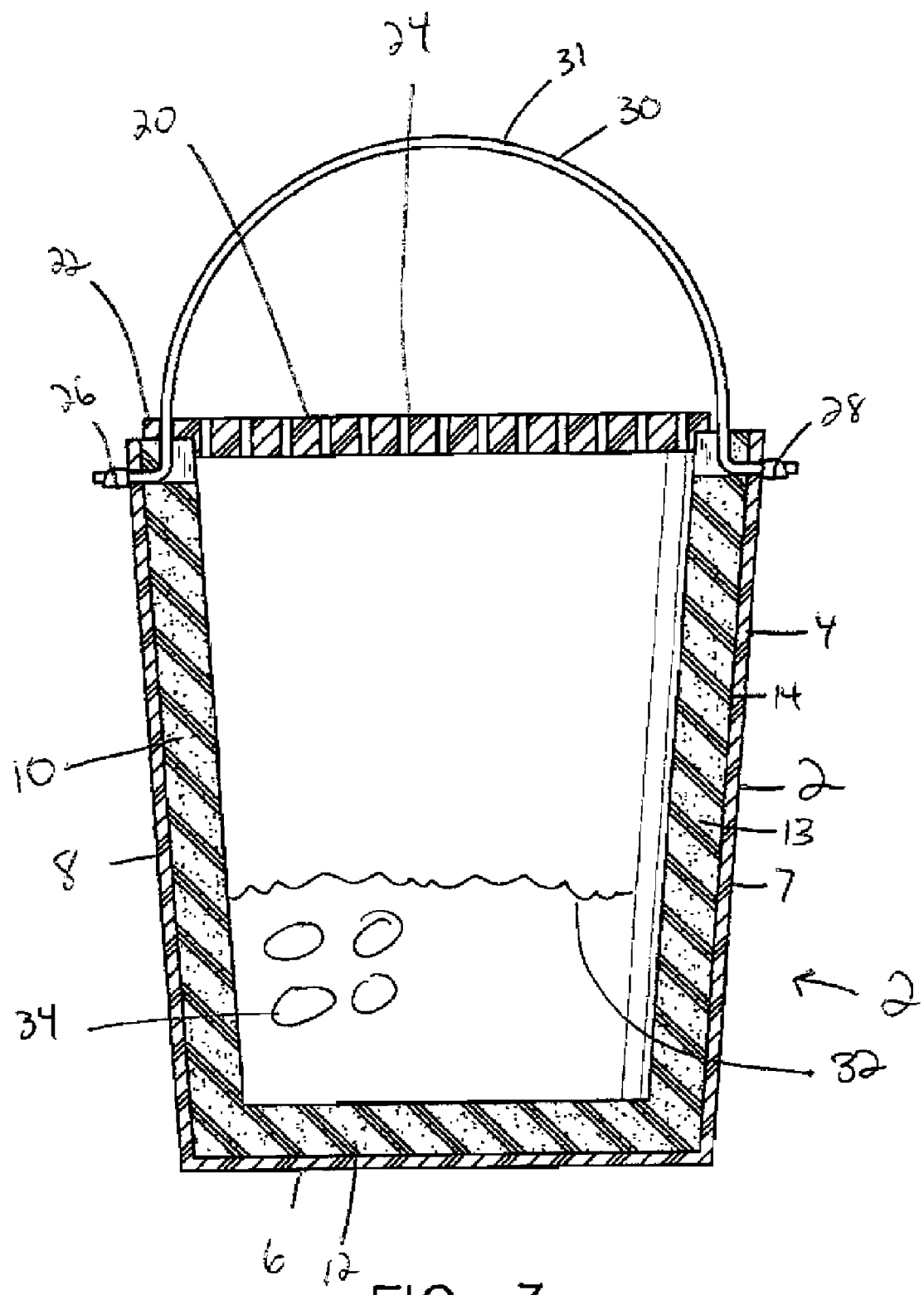
FIG. 3 shows a side cutaway view of the insulated minnow bucket as it would appear in use with the lid closed over the top of the outer shell and inner shell.

With reference now to the drawings, and in particular to FIGS. 1 through 3 thereof, a new insulated minnow bucket embodying the principles and concepts of the present invention and generally designated by the reference numeral 2 will be described.

As best illustrated in FIGS. 1 through 3, the insulated minnow bucket 2 comprises an outer shell 4 that includes a base 6 and a perimeter wall 8. The base 6 is preferably circular and has two surfaces, a top surface and a bottom surface. The perimeter wall 8 has two edges, a top edge and a bottom edge, with the bottom edge of the perimeter wall 8 being attached to the top surface of the base 6 around the edge of the base.

The outer shell 4 can be fabricated from a number of substances. However, the outer shell 4 is preferably fabricated from plastic material 7, with this plastic material 7 being a hard plastic material.

The minnow bucket 2 further comprises an inner shell 10 that includes a base 12 and a perimeter wall 14. The base 12 is preferably circular and has two surfaces, a top surface and a bottom surface. The perimeter wall 14 has two edges, a top edge and a bottom edge, with the bottom edge of the perimeter wall 14 being attached to the top surface of the base 12 around the edge of the base 12.

The inner shell 10 can be fabricated from a number of substances. However, the inner shell 10 is preferably fabricated from foam material 13, with this foam material 13 preferably being a polystyrene-based material.

When the inner shell 10 is placed against the outer shell 4, the inner shell 10 is designed to fit snugly within the outer shell 4. In addition, the top edge of the perimeter wall 14 of the inner shell 10 is designed to be the same level as that of the top edge of the perimeter wall 8 of the outer shell 4 when the inner shell 10 is placed within the outer shell 4.

The insulated minnow bucket 2 further comprises a lid 20 that has two surfaces, a top surface and a bottom surface.

The lid 20 is designed to be placed on the top edge of the perimeter walls of both the inner shell and the outer shell. The lid 20 preferably has a plurality of holes 24 in it and also has an attached nodule 22. The nodule 22 has an incorporated nodule hole 23.

The outer shell 4 further includes a pair of holes 16 and 17 that are located near the top edge of the perimeter wall 6 of the outer shell 4, with the holes 16 and 17 being located opposite one another and extending through the outer shell 4 in a direction perpendicular to a longitudinal axis of the outer shell 4 (see FIG. 3). In addition, the inner shell 10 further includes a pair of holes 18 and 19 that are located near the top edge of the perimeter wall 14 of the inner shell 10, with the holes 18 and 19 being located opposite one another and extending through the inner shell 10 in a direction perpendicular to a longitudinal axis of the inner shell 10 (see FIG. 3).

The insulated minnow bucket 2 further includes a handle 30 that has two ends, a first end and a second end. This handle 30 is preferably a length of rope 31. The first end of the handle 30 is designed to be inserted through the nodule hole 23 in the nodule 22 on the lid 20 and then inserted through hole 16 on the outer shell 4 and hole 18 on the inner shell 10, while the second end of the handle 30 is designed to be inserted through the hole 17 on the outer shell 4 and hole 19 on the inner shell 10. Then, the first end of the handle 30 is made into a knot 26, while the second end of the handle 30 is made into a knot 28.

Placing the lid on the outer shell 4 and inner shell 10 in this manner will allow the bait within the insulated minor bucket 2 to remain within the insulated minnow bucket 2, while at the same time, provide continuous ventilation to bait, minnows, and related items within the insulated minnow bucket 2. Furthermore, the presence of the lid 20 will assist the insulating properties of the outer shell 4 and the inner shell 10.

Within the inner shell 10 is placed a volume of water 32, in which a volume of bait 34 can be placed. The bait 34 is preferably minnows but can just as well be other types of bait that are commonly used in fishing.

The outer shell 4 has a pair of holes 16 and 17 located near the top edge of the perimeter wall 8, with these holes 16 and 17 being located opposite one another. Furthermore, the inner shell 10 has a pair of holes 18 and 19 located near the top edge of the perimeter wall 8, with these holes 18 and 19 being located opposite one another.

When the insulated minnow bucket 2 is fully formed, the bucket 2 preferably has a height of about 12 inches and a diameter of 12-14 inches.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What I claim as my invention is:

1. An insulated minnow bucket comprising:
   (a) a circular outer shell fabricated from plastic material, the outer shell including a base, the base of the outer shell having two surfaces comprising a top surface and a bottom surface, the outer shell further comprising a perimeter wall, the perimeter wall of the outer shell having two edges comprising a top edge and a bottom edge, the bottom edge of the perimeter wall of the outer shell being attached to the top surface of the base of the outer shell around an edge of the base of the outer shell,
   (b) a circular inner shell, the inner shell including a base, the base of the inner shell having two surfaces comprising a top surface and a bottom surface, the inner shell further comprising a perimeter wall, the perimeter wall of the inner shell having two edges comprising a top edge and a bottom edge, the bottom edge of the perimeter wall of the inner shell being attached to the top surface of the base of the inner shell around an edge of the base of the inner shell, wherein the inner shell is placed within the outer shell,
   (c) a unitary lid having two surfaces comprising a top surface and a bottom surface, and a plurality of holes dispersed within the complete area of said lid, said lid further comprising a nodule having a hole therein,
   (d) a handle fabricated from rope, said handle having two ends, a first end and a second end,
   (e) means for attaching the handle to the lid, the inner shell, and the outer shell comprising:
      a first pair of holes comprising a first hole and a second hole, the first pair of holes being located in the outer shell near the top edge of the perimeter wall of the outer shell, wherein each of the holes of the first pair of holes are located opposite one another and extend through the outer shell in a direction which is perpendicular to a longitudinal axis of the outer shell,
      a second pair of holes comprising a first hole and a second hole, the second pair of holes being located in the inner shell near the top edge of the perimeter wall of the inner shell, wherein each of the holes of the second pair of holes are located opposite one another and extend through the inner shell in a direction which is perpendicular to a longitudinal axis of the inner shell,
      wherein the first end of the handle is inserted through the nodule hole in the nodule, further wherein the first end of the handle is inserted through the first hole of the second pair of holes, and further wherein the first end of the handle is inserted through the first hole of the first pair of holes, and
      wherein the second end of the handle is inserted through the second holes of the second pair of holes, and further wherein the second end of the handle is inserted through the second hole of the first pair of holes, and further wherein the first end of the handle is made into a first knot after it has been inserted through the nodule hole, the inner shell and the outer shell, and further wherein the second end of the handle is made into a second knot after it has been inserted through the inner shell and the outer shell,
   (f) wherein the top edge of the perimeter wall of the inner shell is the same height as the top edge of the perimeter wall of the outer shell when the inner shell is placed within the outer shell.

* * * * *